(12) United States Patent
Alverson et al.

(10) Patent No.: US 12,242,325 B2
(45) Date of Patent: Mar. 4, 2025

(54) CORE ACTIVATION AND DEACTIVATION FOR A MULTI-CORE PROCESSOR

(71) Applicant: Advanced Micro Devices, Inc., Santa Clara, CA (US)

(72) Inventors: William Robert Alverson, Del Valle, TX (US); Amitabh Mehra, Fort Collins, CO (US); Jerry Anton Ahrens, Sister Bay, WI (US); Grant Evan Ley, Eden, UT (US); Anil Harwani, Austin, TX (US); Joshua Taylor Knight, Georgetown, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/708,453

(22) Filed: Mar. 30, 2022

(65) Prior Publication Data

US 2023/0315191 A1 Oct. 5, 2023

(51) Int. Cl.
*G06F 1/32* (2019.01)
*G06F 1/3206* (2019.01)
*G06F 1/3287* (2019.01)
*G06F 9/445* (2018.01)

(52) U.S. Cl.
CPC .......... *G06F 1/3287* (2013.01); *G06F 1/3206* (2013.01); *G06F 9/44505* (2013.01)

(58) Field of Classification Search
CPC ... G06F 1/3287; G06F 1/3206; G06F 9/44505
See application file for complete search history.

(56) References Cited

U.S. PATENT DOCUMENTS

| | | |
|---|---|---|
| 7,382,366 B1 | 6/2008 | Klock et al. |
| 9,360,909 B2 | 6/2016 | Wells et al. |
| 10,466,737 B2 | 11/2019 | Han |
| 10,904,086 B1 | 1/2021 | Varia et al. |
| 11,262,924 B2 | 3/2022 | Alverson et al. |
| 11,835,998 B2 | 12/2023 | Mehra et al. |
| 11,977,757 B2 | 5/2024 | Ley et al. |
| 2003/0097602 A1* | 5/2003 | Bigbee ................ G06F 9/30003 712/E9.032 |

(Continued)

FOREIGN PATENT DOCUMENTS

| | | |
|---|---|---|
| CN | 118871895 A | 10/2024 |
| WO | 2023211606 A1 | 11/2023 |

OTHER PUBLICATIONS

PCT/US2023/062509, "International Search Report and Written Opinion", PCT Application No. PCT/US2023/062509, May 26, 2023, 10 pages.

(Continued)

*Primary Examiner* — Stefan Stoynov
(74) *Attorney, Agent, or Firm* — FIG. 1 Patents

(57) ABSTRACT

Core activation and deactivation for a multi-core processor is described. In accordance with the described techniques, a processor having multiple cores operates using a first core configuration. A request to switch from the first core configuration to a second core configuration is received. Responsive to the request, a switch from the first core configuration to the second core configuration occurs by adjusting a number of active cores of the processor without rebooting.

20 Claims, 6 Drawing Sheets

(56) References Cited

U.S. PATENT DOCUMENTS

| | | | |
|---|---|---|---|
| 2006/0149975 A1* | 7/2006 | Rotem | G06F 12/0875 |
| | | | 713/300 |
| 2007/0106428 A1* | 5/2007 | Omizo | G05D 23/19 |
| | | | 713/324 |
| 2008/0114973 A1 | 5/2008 | Norton et al. | |
| 2008/0276026 A1* | 11/2008 | Branover | G06F 1/3203 |
| | | | 710/260 |
| 2011/0040902 A1 | 2/2011 | Housty | |
| 2011/0231637 A1 | 9/2011 | Schuette | |
| 2012/0159496 A1* | 6/2012 | Dighe | G06F 9/4893 |
| | | | 718/102 |
| 2014/0095904 A1 | 4/2014 | Ananthakrishnan et al. | |
| 2014/0136823 A1 | 5/2014 | Ragland et al. | |
| 2016/0085551 A1 | 3/2016 | Greathouse et al. | |
| 2016/0282919 A1 | 9/2016 | Wells et al. | |
| 2019/0079806 A1 | 3/2019 | Ragland et al. | |
| 2020/0019462 A1 | 1/2020 | Prather et al. | |
| 2020/0097201 A1 | 3/2020 | Irshad et al. | |
| 2020/0192420 A1 | 6/2020 | Irshad et al. | |
| 2020/0364041 A1 | 11/2020 | Bulusu et al. | |
| 2023/0324947 A1 | 10/2023 | Mehra et al. | |
| 2023/0350591 A1 | 11/2023 | Ley et al. | |
| 2023/0350696 A1 | 11/2023 | Harwani et al. | |

OTHER PUBLICATIONS

U.S. Appl. No. 17/732,718, "Notice of Allowance", U.S. Appl. No. 17/732,718, filed Jan. 4, 2024, 7 pages.
U.S. Appl. No. 17/732,741, "Non-Final Office Action", U.S. Appl. No. 17/732,741, filed Jan. 2, 2024, 11 pages.
U.S. Appl. No. 17/732,718, "Non-Final Office Action", U.S. Appl. No. 17/732,718, filed Sep. 14, 2023, 17 pages.
PCT/US2023/016453, "International Search Report and Written Opinion", PCT Application No. PCT/US2023/016453, Jul. 12, 2023, 11 pages.
U.S. Appl. No. 17/732,718, "Corrected Notice of Allowability", U.S. Appl. No. 17/732,718, filed Feb. 29, 2024, 2 pages.
U.S. Appl. No. 17/732,718, "Corrected Notice of Allowability", U.S. Appl. No. 17/732,718, filed Apr. 10, 2024, 2 pages.
U.S. Appl. No. 17/732,741, "Final Office Action", U.S. Appl. No. 17/732,741, filed Jul. 22, 2024, 13 pages.
U.S. Appl. No. 17/732,741, filed Nov. 12, 2024, "Non-Final Office Action", U.S. Appl. No. 17/732,741, filed Nov. 12, 2024, 16 pages.
23781949.5, "Foreign Office Action", EP Application No. 23781949.5, Nov. 7, 2024, 3 pages.

\* cited by examiner

CORE ACTIVATION AND DEACTIVATION FOR A MULTI-CORE PROCESSOR

BACKGROUND

Processors having multiple cores (e.g., two or more separate processing units) on a single integrated circuit are commonly referred to as "multi-core processors." Manufacturers typically integrate the multiple cores onto a single integrated circuit die or onto multiple dies in a single chip package. Multi-core processors are widely used across many application domains, including general-purpose, embedded, digital signal processing (DSP), network, and graphics (GPU).

BRIEF DESCRIPTION OF THE DRAWINGS

The detailed description is described with reference to the accompanying figures.

DETAILED DESCRIPTION

Overview

Figure 1:
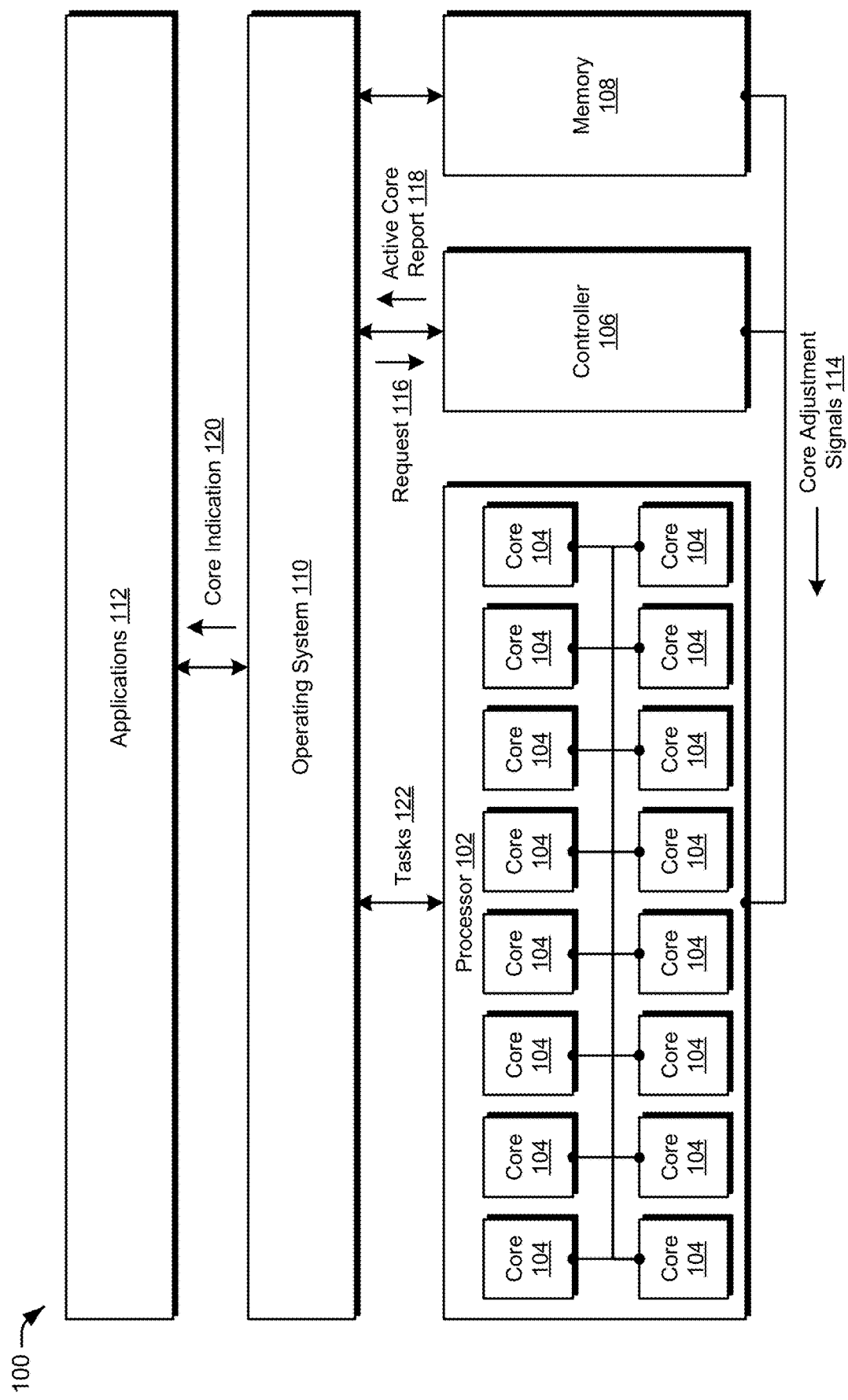
FIG. 1 is a block diagram of a non-limiting example system having a processor with multiple cores and a controller that activates and deactivates the cores without rebooting.

In many cases, it is beneficial to deactivate certain cores of a multi-core processor, such as by removing slower cores, removing higher power cores, removing hot cores, and so forth. However, conventional systems require a reboot of the system in order to re-initialize the desired cores and to reset the operating system's awareness of available cores. Rebooting the system, however, is obtrusive to the end user experience while also disrupting active workloads and subjecting the system and end user to the time and stress of a reboot cycle.

To solve these problems, the described techniques enable selective activation and deactivation of cores of a processor "on the fly" and without rebooting the system. Moreover, the system adjusts the active cores of the processor and also informs the operating system of the cores which are currently active, which enables the operating system to inform various applications of the cores which are currently active. Doing so prevents applications and the operating system from scheduling tasks on deactivated cores and instead causes the system to utilize only the activated cores for performing tasks.

The ability to dynamically change the number of active cores without rebooting the system reduces the disruption to active workloads while also improving the end user experience as compared to conventional systems. Moreover, activating and deactivating cores "on the fly" enables the system to optimize the number of active cores for a variety of different usage scenarios and system conditions, such as by deactivating cores that are too hot or too slow, optimizing the number of active cores for different applications or workflows, and so forth.

In some aspects, the techniques described herein relate to a method including: operating a processor having multiple cores using a first core configuration, receiving a request to switch from the first core configuration to a second core configuration, and responsive to the request, switching from the first core configuration to the second core configuration by adjusting a number of active cores of the processor without rebooting.

In some aspects, the techniques described herein relate to a method, wherein the switching from the first core configuration to the second core configuration further includes deactivating one or more cores of the processor without rebooting.

In some aspects, the techniques described herein relate to a method, wherein the switching from the first core configuration to the second core configuration further includes activating one or more cores of the processor without rebooting.

In some aspects, the techniques described herein relate to a method, wherein the first core configuration has a different number of active cores than the second core configuration.

In some aspects, the techniques described herein relate to a method, wherein the first core configuration has a different selection of active cores than the second core configuration.

In some aspects, the techniques described herein relate to a method, further including informing an operating system of the number of active cores.

In some aspects, the techniques described herein relate to a method, wherein the informing includes providing an active core report to the operating system, wherein the active core report is formatted according to an Advanced Configuration and Power Interface (ACPI) specification.

In some aspects, the techniques described herein relate to a method, wherein the informing causes the operating system to provide an indication of the active cores to one or more applications.

In some aspects, the techniques described herein relate to a method, further including informing at least one of an operating system or applications about a branding configuration of the processor corresponding to the second core configuration.

In some aspects, the techniques described herein relate to a method, wherein the request is received via user input to a user interface that selects one or more cores to deactivate.

In some aspects, the techniques described herein relate to a method, wherein the request is received via user input to a user interface that selects one or more cores to activate.

In some aspects, the techniques described herein relate to a method, wherein the request is received from an application or an operating system.

In some aspects, the techniques described herein relate to a system including: a memory, a processor having multiple cores, and a controller configured to selectively activate and deactivate cores of the processor without rebooting.

In some aspects, the techniques described herein relate to a system, wherein the controller is configured to deactivate cores of the processor without rebooting by communicating signals to the processor for power gating or clock gating cores that are to be deactivated.

In some aspects, the techniques described herein relate to a system, wherein the controller is configured to selectively activate and deactivate cores of the processor without rebooting by switching from a first core configuration to a second core configuration.

In some aspects, the techniques described herein relate to a system, wherein the first core configuration has a different number of active cores than the second core configuration.

In some aspects, the techniques described herein relate to a system, wherein the first core configuration has a different selection of active cores than the second core configuration.

In some aspects, the techniques described herein relate to a system, wherein the controller is further configured to inform an operating system of a number and selection of active cores of the processor.

In some aspects, the techniques described herein relate to a method including: displaying a user interface including controls for activating or deactivating cores of a processor having multiple cores, receiving, via the user interface, user input to deactivate one or more cores of the processor, and deactivating the one or more cores of the processor without rebooting.

In some aspects, the techniques described herein relate to a method, wherein the user interface includes controls for activating or deactivating each of the multiple cores of the processor.

FIG. 1 is a block diagram of a non-limiting example system 100 having a processor with multiple cores and a controller that activates and deactivates the cores without rebooting. In particular, the system 100 includes processor 102 which has multiple cores 104. Processors having multiple cores (e.g., two or more separate processing units) on a single integrated circuit are commonly referred to as "multi-core processors." The system 100 also includes controller 106 and memory 108. The processor 102, the controller 106, and the memory 108 are operable to implement operating system 110 and one or more applications 112.

In accordance with the described techniques, the processor 102, the controller 106, and the memory 108 are coupled to one another via a wired or wireless connection. Example wired connections include, but are not limited to, system buses connecting two or more of the processor 102, the controller 106, and the memory 108. Examples of devices in which the system 100 is implemented include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The memory 108 is a device or system that is used to store information, such as for immediate use in a device, e.g., by the processor 102. In one or more implementations, the memory 108 corresponds to semiconductor memory where data is stored within memory cells on one or more integrated circuits. In at least one example, the memory 108 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 108 corresponds to or includes non-volatile memory, examples of which include flash memory, read-only memory (ROM), programmable read-only memory (PROM), erasable programmable read-only memory (EPROM), and electronically erasable programmable read-only memory (EEPROM). The memory 108 is configurable in a variety of ways that support dynamically adjusting a number and selection of active cores in the processor 102 without departing from the spirit or scope of the described techniques.

Broadly, the controller 106 communicates with the operating system 110 to adjust operation of hardware components, including operation of the processor 102. By way of example, and not limitation, the controller 106 sends signals to those components (e.g., the processor 102) to adjust their operation, such as by sending signals to adjust power consumption of the components, to adjust a speed of a cooling fan, and to activate and/or deactivate components. This includes sending signals to adjust operation of components to prevent overheating and use of excess energy. In one or more variations, the controller 106 is implemented using hardware, software, firmware or a combination thereof. One example of the controller 106 is a system management unit (SMU) which has SMU firmware.

In accordance with the described techniques, the controller 106 is configured to selectively activate and deactivate the cores 104 of the processor 102 without rebooting the system 100. For instance, the controller 106 is configured to signal the processor 102 to activate or deactivate the cores 104 on an individual basis without rebooting the system 100. Alternatively or in addition, the controller 106 is configured to signal the processor 102 to activate or deactivate multiple cores 104 at a time without rebooting the system 100. In one or more implementations, the controller 106 communicates signals to the processor 102 for power gating and/or clock gating the cores 104 that are to be deactivated. Such signals, communicated by the controller 106 to the processor 102 to adjust a number of active cores 104 and/or adjust which of the cores 104 are activated or deactivated, are illustrated as core adjustment signals 114.

Adjusting which cores of a multi-core processor are active "on the fly" (e.g., without rebooting) contrasts with conventional techniques. For instance, conventional approaches involve rebooting the system. During this reboot, an adjusted number or selection of cores is activated. Further, the operating system is informed about the number or selection of active cores as part of the reboot. In accordance with the described techniques, though, the controller 106 adjusts the number or selection of active cores 104 without rebooting and also informs the operating system of the cores which are currently active.

In the illustrated example, the controller 106 is depicted receiving a request 116 from the operating system 110. The controller 106 is also depicted as informing the operating system 110 of the number of active cores. In this example, the controller 106 informs the operating system 110 of the number of active cores by providing an active core report 118 to the operating system 110. Broadly, the request 116 indicates an adjustment to a number or selection of the cores 104 of the processor 102, such that how many cores 104 and/or which cores 104 to activate or deactivate is indicated in or determinable from the request 116. The active core report 118 indicates to the operating system 110 an adjustment to the active cores 104, e.g., the active core report 118 indicates which of the cores 104 are activated (or deactivated) in connection with the adjustment. In this way, the controller 106 informs the operating system 110 and the applications 112 of the current core count, e.g., the number of cores 104 that are active. In one or more implementations, the active core report 118 includes a brand string, which identifies a branding configuration of the processor 102. In this way, the controller 106 informs the operating system 110 and the applications 112 about the branding configuration of the processor 102, in at least one implementation. Through the active core report 118, the operating system 110 is thus made "aware" of the adjustment carried out by the controller 106, which it carries out by power gating and/or clock gating one or more of the cores 104.

In one or more implementations, in order to inform the operating system 110 about which cores 104 are activated (or deactivated) in connection with an adjustment, the controller 106 formats the active core report 118. For instance, the controller 106 formats the active core report 118 according to a specification associated with a power configuration. In one or more implementations, the controller 106 formats the active core report 118 according to the Advanced Configuration and Power Interface (ACPI) specification. In at least one such implementation, the controller 106 is configured to indicate (e.g., falsely) to the operating system 110 via the active core report 118 that selective cores 104 (e.g., which are requested to be deactivated) are too hot (e.g., hotter than a threshold) or are not available, even though a physical temperature of those cores 104 does not actually exceed the threshold. When the operating system 110 is notified that a core 104 is too hot, the operating system 110 is configured to programmatically take the core 104 "offline" so that it is not available for use. Due to this, a scheduler (not shown) of the operating system 110 avoids scheduling threads, processes, and/or data flows using the cores 104 that have been taken offline.

In at least one example implementation, the operating system 110 and/or one or more of its components, are configured to monitor thermal zones (e.g., of the processor 102) and, based on the monitoring, they are further configured to instruct the controller 106 (e.g., via the request 116) to control conditions (e.g., power consumption and cooling-fan speed) under which hardware components in those thermal zones operate. In this example, the operating system 110 and/or those one or more components are not configured to monitor the cores 104, per se, or to instruct the controller 106, specifically, to activate or deactivate particular cores 104. This can be the case where the communications between the operating system 110 and the controller 106 are governed by a specification, such as the ACPI specification. At least one version of the ACPI specification specifies communication protocols for controlling operating conditions of hardware components on a thermal-zone by thermal-zone basis—rather than on a core-by-core basis. In at least one such implementation, the described techniques therefore exploit these communication protocols to activate and deactivate the cores 104 without rebooting the system and also so that the operating system 110 is aware of the active cores 104.

By way of example, in one or more implementations where communication between the operating system 110 and the controller 106 is governed at least in part by such a specification, the controller 106 includes a table (not shown) that maps thermal zones to the cores 104. For instance, the table maps each core 104 to a respective thermal zone, such that there is a one-to-one mapping between the cores 104 and thermal zones. Accordingly, when the controller 106 receives an indication (via the request 116) that a thermal zone is "too hot," the controller 106 identifies the respective core 104, based on the mapping between thermal zones and cores 104 in the table, and then deactivates the respective core 104.

In implementations that further involve outputting a user interface and allowing a user to select which cores 104 of the processor 102 to activate or deactivate via the user interface, an application 112 or firmware that corresponds to the user interface also maps selected cores 104 to thermal zones, e.g., by using a table similar to the one included at the controller 106. Based on the mapping, the application 112 or firmware is configured to communicate an indication to the operating system 110 which specifies thermal zones to control. This is so that the operating system 110 receives a type of information that enables it to communicate with the controller 106, e.g., thermal-zone based information rather than core-based information.

Although the example discussed just above exploits a protocol for configuring communications between the operating system 110 and the controller 106 (e.g., the request 116 and the active core report 118) based on thermal zones, in one or more implementations, the communications between the operating system 110 and the controller 106 are configured based on cores. In such implementations, use of a mapping between cores and thermal zones (e.g., maintained in one or more tables) is not necessary. The request 116 and the active core report 118 are configurable in various ways—that enable the controller 106 to activate and deactivate the cores 104 on a core-by-core basis "on the fly" and that enable the operating system 110 to inform applications 112 how many cores are "online" and also when cores 104 go "offline" without rebooting—without departing from the spirit or scope of the described techniques.

Once informed about an adjusted configuration of active cores 104, the operating system 110 further provides an indication of the active cores 104 to the applications 112. In the illustrated example, core indication 120 indicates to the applications 112 the number of active cores 104 of the processor 102 that are operable. Based on the number of active cores 104, a scheduler of the operating system 110 schedules tasks 122 for processing by the processor 102's cores 104, e.g., on the active cores 104. These tasks 122 include threads, processes, and data flows for implementing the applications 112 and the operating system 110.

In one or more implementations, the system 100 enables users to provide input for adjusting the active cores 104, such as a number of active cores and/or which specific cores 104 are activated and deactivated. Example user interfaces which enable users to request adjustments to the active cores are discussed in more detail in relation to FIGS. 3-5. In such examples, the request 116 is based on and responsive to user input.

Alternatively or in addition, the system 100 enables one or more of the applications 112 to request adjustments to the active cores, such as a number of active cores and/or which specific cores 104 are activated and deactivated. In such examples, the request 116 is based on and responsive to communication from an application 112. Alternatively or in addition, the operating system 110 (or a process of the operating system 110) is configured to request adjustments to the activated cores for various applications 112. For instance, when a particular application 112 associated with a particular core configuration is launched, the system 100 enables the operating system 110, or a process that controls core configurations for various applications, to request an adjustment of the processor 102's core configuration to the particular core configuration associated with the particular application.

In one or more implementations, a number of cores 104 and/or which of the cores 104 are activated and deactivated is based on thermal optimization and/or power optimization. Where active cores 104 are adjusted based on thermal optimization, for instance, the number and selection of cores 104 for at least one configuration is adjusted so that each activated core 104 is spaced sufficiently on the processor 102's integrated circuit from other activated cores. In other words, there is sufficient space on the integrated circuit between a physical position of each active core 104.

Consider an example in which the processor 102 includes eight cores and in which those eight cores 104 are arranged substantially along an axis, e.g., they are arranged "in a line." In this example, consider also that three of the eight cores 104 are to be activated. In order to minimize a thermal impact of the cores 104 on one another, one example core configuration corresponds to having the first core 104, the eighth core 104, and either the third or fourth core 104 activated and the other cores 104 deactivated.

In one or more implementations, at least one of the controller 106, the operating system 110, or an application 112 is configured to determine (or specify) which of the cores 104 to activate based on a number of cores 104 to be activated and based on optimizing for thermal conditions. By way of example, the controller 106, the operating system 110, or the application 112 references a table that specifies which cores 104 of the processor 102 to activate based on a number of active cores 104 and a type of optimization, e.g., thermal. Alternatively or in addition, the controller 106, the operating system 110, and/or the application 112 requests to switch from using cores 104 that are activated at a given time to instead using the cores 104 that are deactivated at the given time (and are potentially cooled down relative to the activated cores), e.g., by activating one or more of those deactivated cores.

In at least one implementation where active cores 104 are adjusted based on power optimization, the number and selection of cores 104 for at least one configuration is adjusted so that an amount of power consumed by the cores 104 in connection with performing the tasks 122 (e.g., threads, processes, and data flows) is minimized. Consider an example in which an application 112 requires only one of the processor 102's multiple cores 104 to perform the application 112's tasks optimally. In this example, and without consideration of tasks 122 associated with other applications 112 or the operating system 110, an example core configuration corresponds to having only one of the cores 104 activated and the other cores 104 deactivated.

In one or more implementations, at least one of the controller 106, the operating system 110, or an application 112 is configured to determine (or specify) which of the cores to activate based on optimizing for power consumption. By way of example, the controller 106 and/or the operating system 110 is configured to determine a number and selection of cores 104 to activate based on specified core requirements of active applications 112, the tasks 122 of those applications, and/or the tasks 122 of the operating system 110. In other words, core requirements of multiple applications 112 and the operating system 110 are taken into account when determining a number and selection of cores 104 to activate in order to optimize for power consumption and still handle the tasks 122 suitably.

Additionally, in one or more implementations, the system 100 adjusts a configuration of active cores 104 based on one or more characteristics of the applications 112 actively using the processor 102, e.g., licensing fees of those applications that are associated with different numbers of cores. When a particular application 112 is launched, for instance, the controller 106 adjusts the active cores 104 on the fly (e.g., without rebooting) so that a certain number of the cores 104 are activated. In at least one variation, a "brand string" of the processor 102 is communicated to the particular application 112 by another component of the system 100 (e.g., the operating system 110), and the brand string is based on the number of cores 104 activated while the particular application 112 executes. In one or more variations, for instance, the brand string communicated when eight cores 104 of the processor 102 are activated is different from the brand strings communicated when one core 104 or sixteen cores 104 are activated. The brand string is thus capable of indicating different branding configurations of processors in connection with different numbers of active cores, even though the processor 102 physically includes a set number of total cores 104.

Consider an example in which an application 112 is associated with a first (lower) licensing fee to operate on a processor with a first (lower) number of cores (e.g., an 8-core processor) and is associated with a second (higher) licensing fee to operate on a processor with a second (higher) number of cores (e.g., a 16-core processor). In accordance with the described techniques, the processor 102 is adjustable on the fly to operate using the first, lower number of cores 104, and the operating system 110 is configurable to provide the application 112 a brand string that corresponds to a processor having the first, lower number of cores 104. In the context of adjusting active cores of a processor "on the fly" (e.g., without rebooting), consider the following discussion of FIG. 2.

Figure 2:
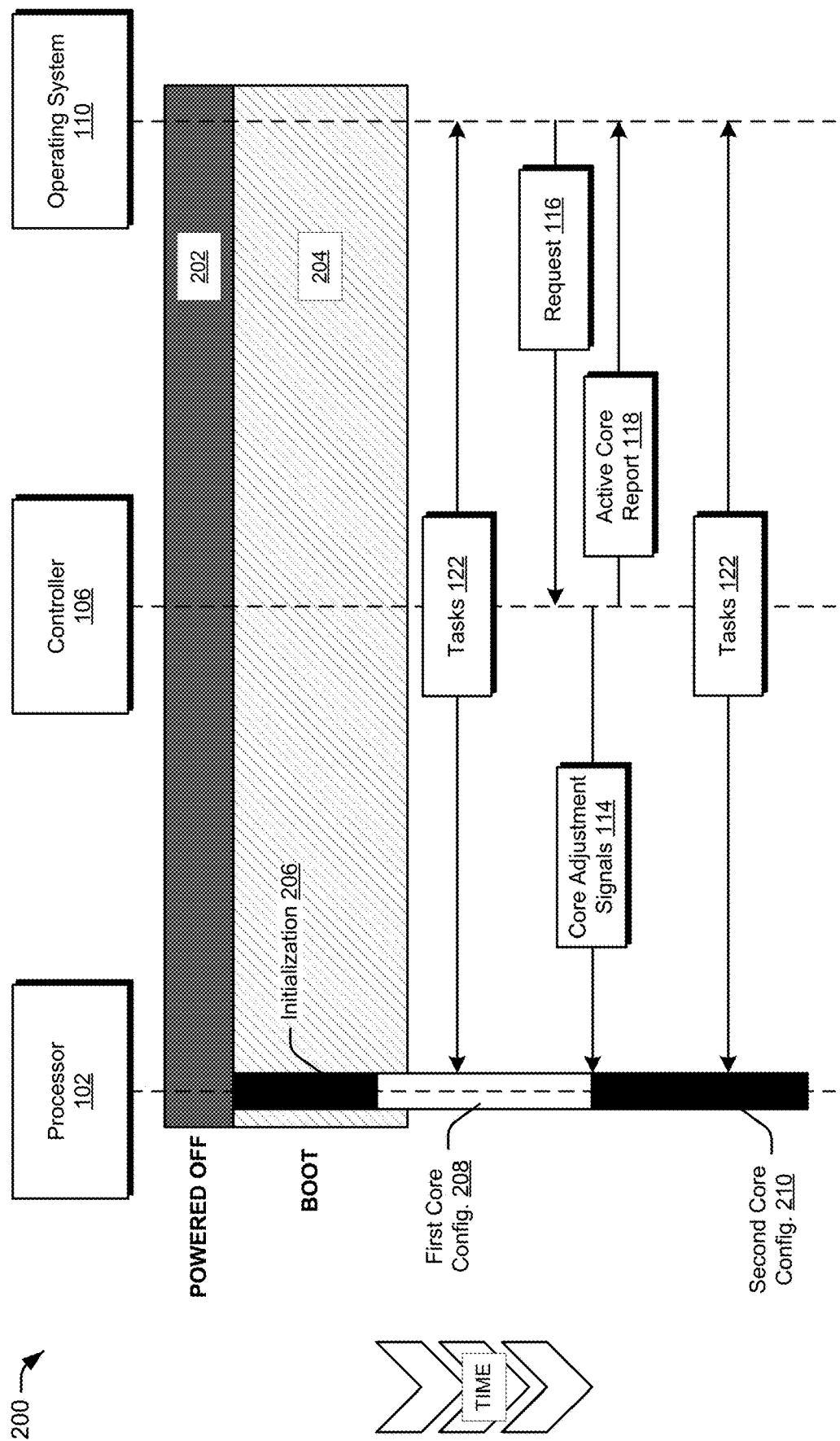
FIG. 2 depicts a non-limiting example in which the controller adjusts a number of active cores of a processor without rebooting.

FIG. 2 depicts a non-limiting example 200 in which the controller adjusts a number of active cores of a processor without rebooting. The example 200 includes from FIG. 1 the processor 102, the controller 106, and the operating system 110. It is to be appreciated that the processor 102 includes the multiple cores 104, but the cores 104 are not depicted in this example due to space constraints.

The example 200 includes a variety of example communications and operations between processor 102, the controller 106, and the operating system 110 over time. In this example 200, the communications and operations are positioned vertically based on time (illustrated on the left hand portion of the example), such that communications and operations closer to a top of the example occur prior to communications or operations further from the top of the example. It follows also that communications or operations closer to a bottom of the example occur subsequent to communications or operations further from the bottom. The example 200 also depicts various phases and/or states of the system 100 or portions of the system 100. These phases and/or states are also positioned in the example 200 vertically based on time, such that phases or states closer to a top of the example occur prior to phases, states, or communications further from the top.

Here, the illustrated example 200 depicts a powered off phase 202 and a boot phase 204 of the system 100. During the powered off phase 202, the system 100 (and the processor 102) is powered off, examples of which include a soft off (e.g., G2/S5 state as specified by Advanced Configuration and Power Interface (ACPI)) and a mechanical off (e.g., G3 state as specified by the ACPI), which require a reboot to return to a working state (e.g., G0/S0 state as specified by ACPI). During the boot phase 204, the system 100 performs various operations, such as hardware initializations, to advance the system 100 to a working state.

In accordance with the described techniques, the boot phase 204 includes initialization 206 of the processor 102. By way of example, firmware, such as basic input/output system (BIOS) or the unified extensible firmware interface (UEFI), initializes and tests the processor 102 and other hardware of the system 100 (e.g., the memory 108) during the boot phase 204. In addition, this firmware (e.g., BIOS or UEFI) performs one or more tasks associated with initializing the operating system 110, e.g., by loading or executing a boot loader or operating system kernel which initializes the operating system 110. The firmware then hands off to the operating system 110, which subsequently controls hardware components.

During the boot phase 204, the processor 102 is initialized or otherwise adjusted to operate using a number of active cores 104 of the processor 102. For example, the processor is initialized to operate using first core configuration 208. In the first core configuration 208 a number of cores of the processor 102 are activated, so that they are subsequently operable to perform the tasks 122 provided to it by the operating system 110. The number of cores 104 activated in connection with the boot phase 204 ranges in variations from one core 104 to all of the cores 104. Additionally, the first core configuration 208 includes a particular selection of the cores 104, the selection comprising the number of cores. In an implementation where the processor 102 includes eight cores 104, for example, there are multiple different selections of four cores 104. Specifically, there are 70 different possible selections of four activated cores 104 with an eight-core processor, e.g., a first selection (first, second, third, and fourth cores), a second selection (first, second, third, and fifth cores), a third selection (first, second, third, and sixth cores), a fourth selection (first, second, third, and seventh cores), a fifth selection (first, second, third, and eighth cores), a sixth selection (second, third, fourth, and fifth cores), and so on. It is to be appreciated that the number and selection of active cores 104 corresponding to the first core configuration 208 varies without departing from the described techniques.

In accordance with the described techniques, the controller 106 receives a request 116 from the operating system to adjust the active cores 104, e.g., to switch from the first core configuration to a second core configuration 210. By way of example, the request 116 indicates to switch to a different number of active cores 104 from the first core configuration 208. Alternatively or additionally, the request 116 indicates to switch to a different selection of active cores 104 from the first core configuration 208. A different selection of active cores 104 can correspond to a same or different number of cores 104 as the first core configuration 208.

Based on the request 116, the controller 106 provides the core adjustment signals 114 to the processor 102, such as by power gating and/or clock gating the cores 104 of the processor 102. The core adjustment signals 114 are configured to adjust which cores 104 are active, such as by activating and deactivating various cores 104 to obtain the second core configuration 210. Responsive to the core adjustment signals 114, the processor 102 is adjusted to operate using the second core configuration 210, which has at least one of a different number or selection of active cores 104 from the first core configuration 208. In the illustrated example 200, the processor 102 operates using the second core configuration 210 subsequent to operating using the first core configuration 208. Notably also, the processor 102 is depicted in the example 200 operating using the first core configuration 208 and being adjusted to operate using the second core configuration 210 without rebooting. Adjusting without rebooting means that there is no additional boot phase depicted while the processor 102 operates with the first core configuration 208, at the switch to the second core configuration 210, or while the processor 102 operates with the second core configuration 210.

In addition to adjusting the active cores 104 without rebooting, the system 100 informs the operating system 110 of the adjustments to the cores 104, which enables the operating system 110 to inform the applications 112 (not depicted in this example) that the active cores 104 are adjusted, e.g., providing the current core count and/or branding configuration information. In this way, the applications 112 and the operating system 110 do not schedule any tasks 122 on deactivated cores 104, and instead use only the activated cores 104 for performing the tasks 122. As discussed above, the controller 106 informs the operating system 110 about active cores 104 using the active core report 118, which in one or more implementations indicates activated and deactivated cores using "thermal zones".

The illustrated example 200 is also depicted as including tasks 122. The operating system 110 schedules one or more of the tasks 122 to be performed by the processor 102 (e.g., its active cores 104) while the processor 102 operates using the first core configuration 208. As noted above, examples of the tasks 122 include threads, processes, and data flows. In at least one example, the processor 102 also requests and obtains data from the memory 108 for carrying out the tasks 122 while operating using the first core configuration 208. The operating system 110 also schedules one or more of the tasks 122 to be performed by the processor 102 (e.g., its active cores 104) while the processor 102 operates using the second core configuration 210. In accordance with the described techniques, the controller 106 is further capable of causing the processor 102 to switch from operating using the second core configuration 210 to operating using the first core configuration 208 or using a different core configuration, without rebooting. In the context of enabling a user to request a number and/or selection of active cores 104 and adjusting which of the cores 104 are active in order to operate the processor 102 using the cores 104 requested, consider the following discussion of FIGS. 3-5.

Figure 3:
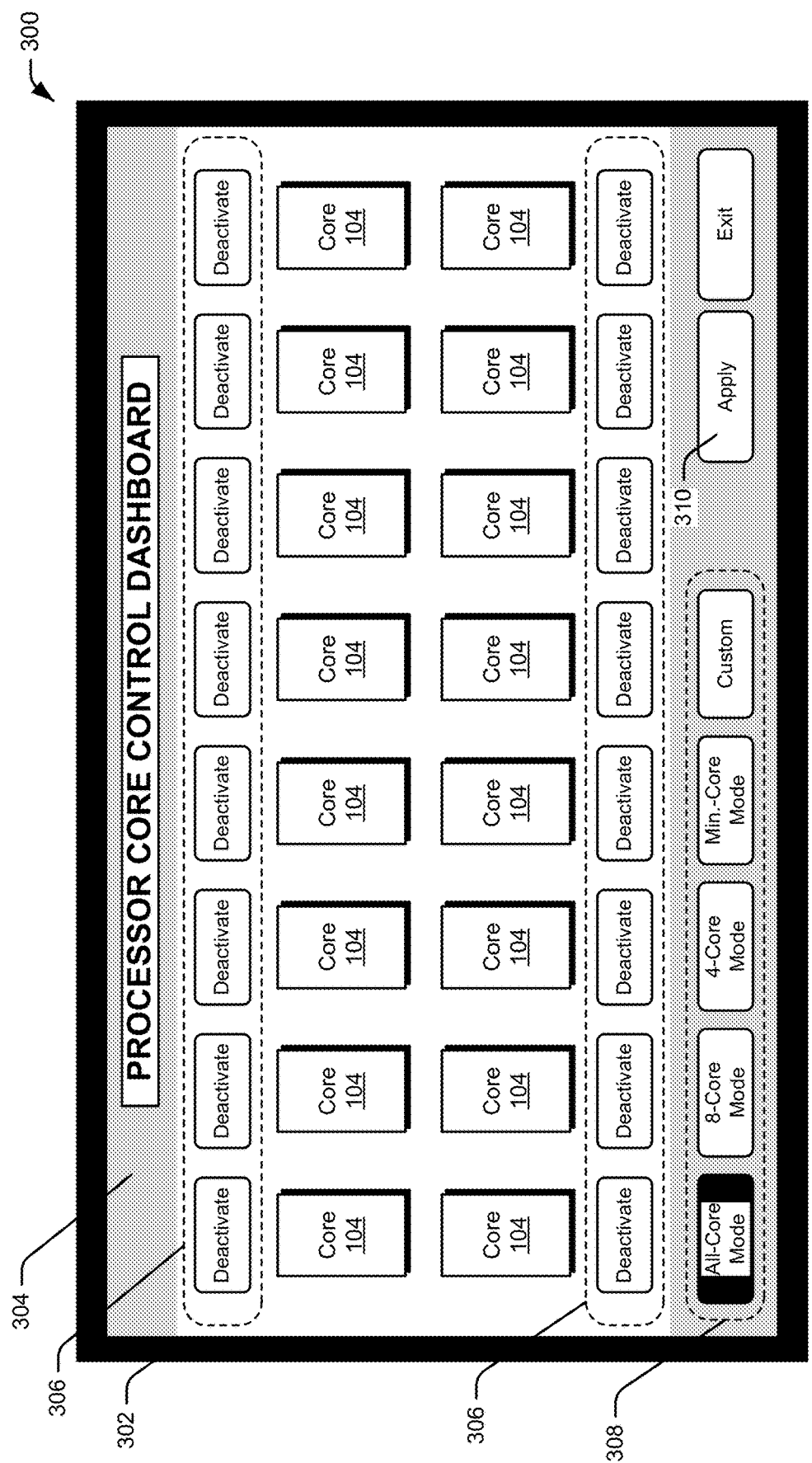
FIG. 3 depicts a non-limiting example of a user interface in one or more implementations.

FIG. 3 depicts a non-limiting example 300 of a user interface in one or more implementations. The example 300 includes a display device 302 outputting a core control user interface 304, which enables a user to control which of the cores 104 are active and to selectively activate and deactivate the cores 104 without rebooting.

In the illustrated example 300, the user interface 304 is depicted displaying representations of multiple cores 104 of the processor 102. In one or more implementations, the representations of the multiple cores 104 are displayed in a manner that is indicative or substantially corresponds to their physical positions on an integrated circuit of the processor 102.

Here, the user interface 304 also includes a respective control 306 for each of the cores 104. The control 306 is selectable by a user to request activation or deactivation of the respective core 104. If a core 104 is active, for instance, the respective control 306 is selectable to request that the core 104 be deactivated. If a core 104 is not active (e.g., it has been deactivated), however, the respective control 306 is selectable to request that the core 104 be activated.

In this example 300, the user interface 304 also includes mode controls 308, which are selectable to request a particular mode of operation of the processor 102 or are transitioned to (and visually emphasized) based on user selection of one or more of the respective controls 306. In one or more variations, the different modes correspond to different numbers of active cores 104, such as a mode in which all the cores 104 are active and various modes in which different subsets of the cores 104 are active. Although not depicted, in one or more implementations, the user interface 304 includes controls that enable a user to select various optimizations of the processor, such as to optimize which of the cores are activated to optimize for power consumption, thermal conditions, and performance, to name just a few.

In one or more implementations, the system 100 causes the active cores 104 to be adjusted responsive to a selection of a single respective control 306. For instance, responsive to selection of a single respective control 306, the operating system 110 submits a request 116 to the controller 106 indicating to adjust (e.g., activate or deactivate) the respective core 104. In response, the controller 106 adjusts (e.g., activates or deactivates) the respective core 104 according to the request 116 without rebooting. The controller 106 then communicates the active core report 118 to the operating system 110 to inform the operating system 110 about the adjustment.

Alternatively, the system 100 causes the active cores 104 to be adjusted responsive to selection of a single mode control 308, responsive to selection of one or more of the respective controls 306 and also selection of an apply control 310, and/or responsive to selection of a mode control 308 and also selection of the apply control 310. When a mode control 308 is selected, in one or more implementations, a component of the system 100 (e.g., an application 112, the operating system 110, or the controller 106) determines which of the cores 104 to activate or deactivate in order to adjust the active cores 104 and enable the processor 102 to operate using the requested mode. In one example, for instance, the application 112, the operating system 110, or the controller 106 references a table which indicates a configuration of active cores 104, such that the cores to activate and deactivate is determinable based on a difference between the indicated configuration and currently active cores. Alternatively or in addition, the application 112, the operating system 110, or the controller 106 determines which of the cores to activate or deactivate based, at least in part, on conditions of the cores 104, such as whether a core 104 is currently operating, whether a core 104 was operating with previous time interval, a temperature of a core 104, an amount of time a core 104 has been operating, and so forth.

In any case, the user interface 304 supports receiving user input (e.g., one or more tap inputs) to request adjustment to active cores 104 of the processor 102 on the fly, e.g., without rebooting. Thus, in accordance with the described techniques, responsive to receipt of user input via the user interface 304, the operating system 110 submits a request 116 to the controller 106 indicating to adjust (e.g., activate or deactivate) cores 104, the controller 106 adjusts (e.g., activates or deactivates) one or more of the cores 104 according to the request 116 without rebooting, and the controller 106 communicates the active core report 118 to the operating system 110 to inform the operating system 110 about the adjustment. In one or more implementations, the adjustment to the different active cores 104 (e.g., from the first core configuration 208 to the second core configuration 210) does not substantially affect interaction of a user with a respective computing device. Because the computing device is not rebooted and because the operating system 110 is informed of the adjustment, for instance, a user is able to continue interacting with the computing device without experiencing significant "downtime," if any.

Note that in this example 300 all of the respective controls 306 include the text 'Deactivate' which indicates that all of the respective cores 104 are active at a time the user interface 304 is output. Additionally, the mode control 308 with the text 'All-Core Mode' is visually emphasized relative to the other mode controls 308. This indicates that the 'All-Core Mode' is the "active" mode, e.g., the mode based on which the processor 102 is configured at the time the user interface 304 is displayed. In this example, the 'All-Core Mode' corresponds to operating the processor 102 with all of its cores 104 active. In the context of adjusting the active cores 104 based on user input, consider the following examples.

Figure 4:
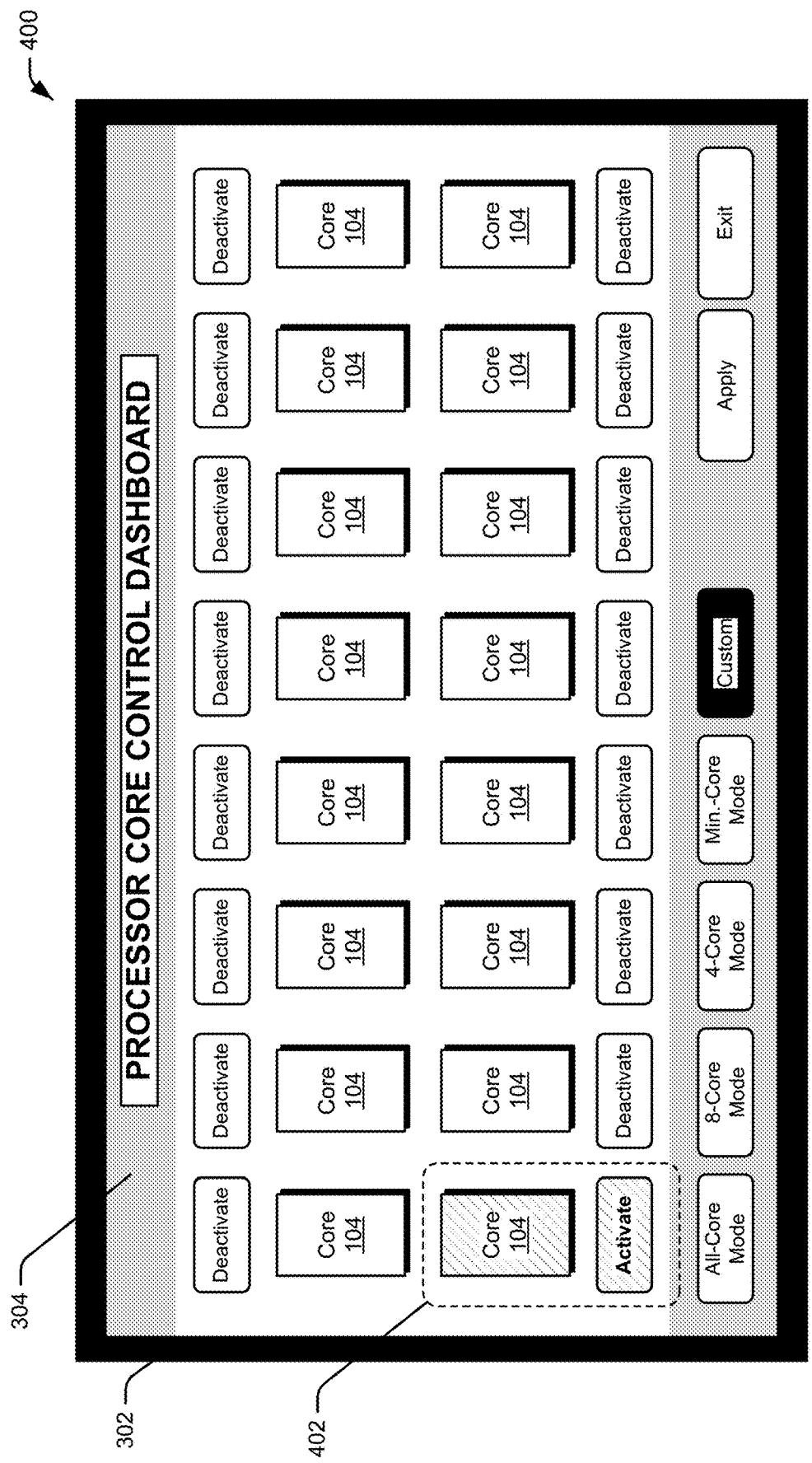
FIG. 4 depicts another non-limiting example of the user interface in one or more implementations.

FIG. 4 depicts another non-limiting example 400 of the user interface in one or more implementations. The example 400 includes from FIG. 3 the display device 302 displaying the user interface 304.

In contrast with the example depicted in FIG. 3, the illustrated example 400 depicts a scenario where not all of the cores are indicated as active in the user interface 304. Instead, the illustrated example 400 represents at 402 that one of the cores 104 of the processor 102 is deactivated. In one example, this core 104 was previously deactivated based on user input to select the respective control 306, e.g., when the respective control 306 included the text 'Deactivate'. In this example 400, the representation of the core 104 and the respective control 306 at 402 are displayed with one or more characteristics, which differentiate the representation and/or the control from those of activated cores. Here, for instance, the representation of the deactivated core 104 and the respective control 306 at 402 are depicted with visual emphasis which is different from the activated cores. It is to be appreciated that the user interface 304 is configurable in various ways to differentiate between activated and deactivated cores without departing from the spirit or scope of the described techniques. The respective controls 306 for activated and deactivated cores are also configurable in various ways (e.g., in addition to or different from text) for activated and deactivated cores 104 without departing from the spirit or scope of the described techniques.

Figure 5:
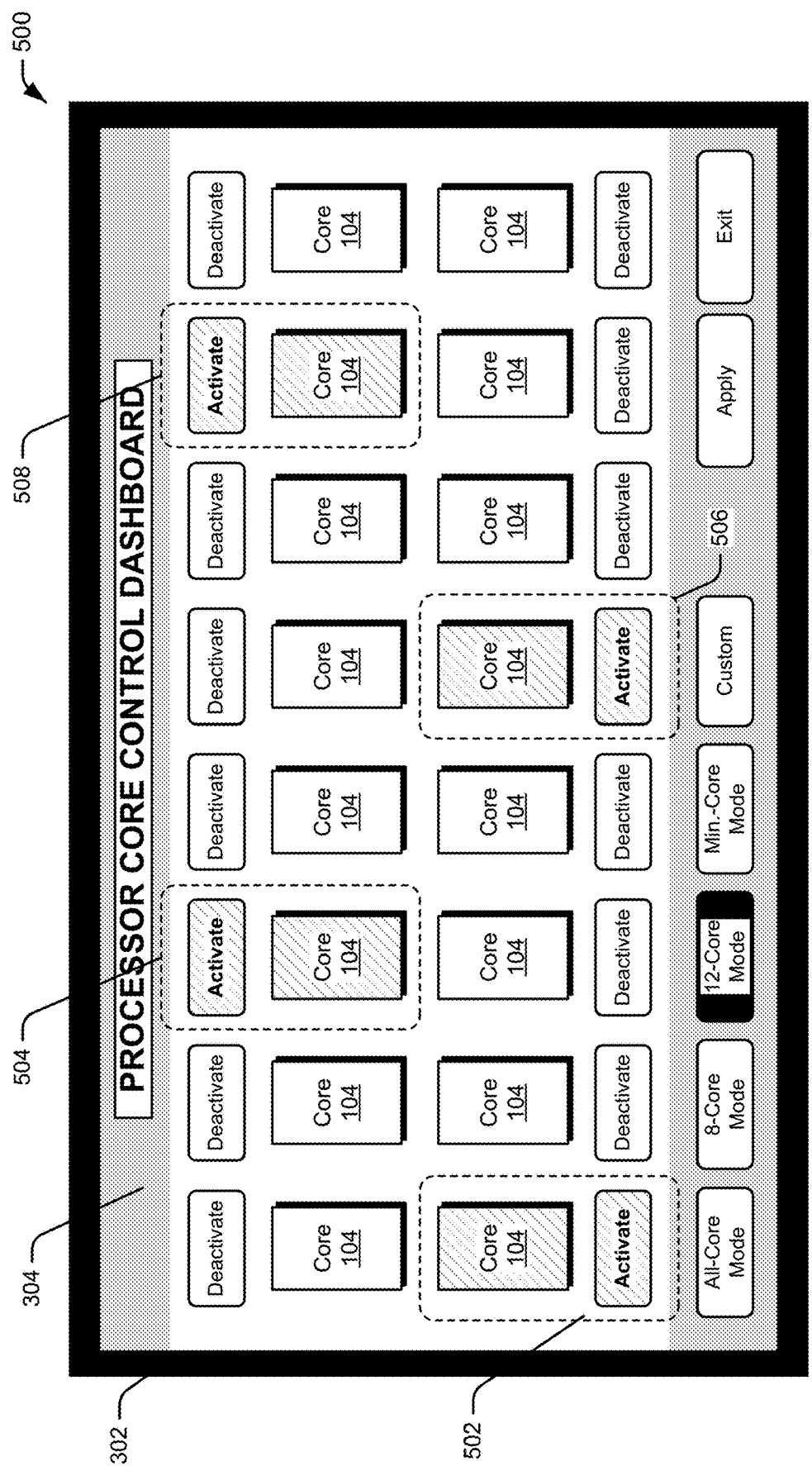
FIG. 5 depicts another non-limiting example of the user interface in one or more implementations.

FIG. 5 depicts another non-limiting example 500 of the user interface in one or more implementations. The example 500 also includes from FIG. 3 the display device 302 displaying the user interface 304.

In contrast with the example depicted in FIG. 4, the illustrated example 500 depicts a scenario where multiple cores 104 are indicated as deactivated in the user interface 304. In particular, the illustrated example 400 represents at 502, 504, 506, 508 that multiple cores 104 of the processor 102 are deactivated, e.g., based on user input in relation to the respective controls 306 selecting to deactivate those cores 104.

Although the user interface 304 is depicted being displayed, in one or more implementations, a user interface that enables user input to be received for requesting adjustment of active cores of a processor is configured, at least in part, in various ways. In one or more implementations, for example, the user interface is at least partially voice-based, e.g., the user interface receives voice commands and initiates actions based on those commands and/or the user interface audibly outputs information about active cores. It is to be appreciated that user interfaces which enable adjustment to various numbers of active cores without rebooting are configured differently than depicted and discussed herein without departing from the spirit or scope of the described techniques.

Having discussed example systems and user interfaces for core activation and deactivation of a multi-core processor, consider the following example procedures.

Figure 6:
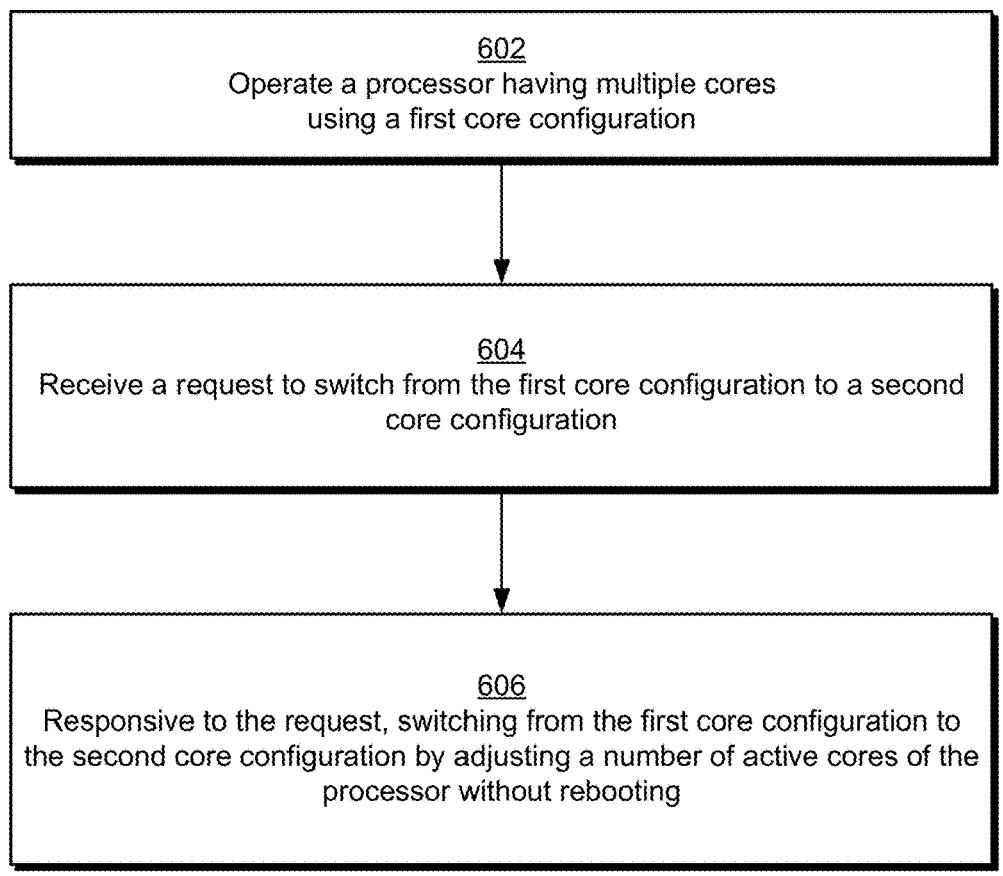
FIG. 6 depicts a procedure in an example implementation of adjusting a number of active cores of a multi-core processor.

FIG. 6 depicts a procedure in an example 600 implementation of adjusting a number of active cores of a multi-core processor.

A processor having multiple cores operates using a first core configuration (block 602). By way of example, during the boot phase 204, the processor 102 is initialized or otherwise adjusted to operate using a number of active cores 104 of the processor 102. For example, the processor operates using first core configuration 208. In the first core configuration 208 a number of cores of the processor 102 are activated, so that they are subsequently operable to perform the tasks 122 provided to it by the operating system 110. The number of cores 104 activated in connection with the boot phase 204 ranges in variations from one core 104 to all of the cores 104. Additionally, the first core configuration 208 includes a particular selection of the cores 104, the selection comprising the number of cores. In an implementation where the processor 102 includes eight cores 104, for example, there are multiple different selections of four cores 104.

A request to switch from the first core configuration to a second core configuration is received (block 604). By way of example, the controller 106 receives a request 116 from the operating system to adjust the active cores 104, e.g., to switch from the first core configuration to a second core configuration 210. By way of example, the request 116 indicates to switch to a different number of active cores 104 from the first core configuration 208. Alternatively or additionally, the request 116 indicates to switch to a different selection of active cores 104 from the first core configuration 208. A different selection of active cores 104 can correspond to a same or different number of cores 104 as the first core configuration 208.

Responsive to the request, a switch from the first core configuration to the second core configuration occurs by adjusting a number of active cores of the processor without rebooting (block 606). By way of example, based on the request 116, the controller 106 provides the core adjustment signals 114 to the processor 102, such as by power gating and/or clock gating the cores 104 of the processor 102. The core adjustment signals 114 are configured to adjust which cores 104 are active, such as by activating and deactivating various cores 104 to obtain the second core configuration 210. Responsive to the core adjustment signals 114, the processor 102 is adjusted to operate using the second core configuration 210, which has at least one of a different number or selection of active cores 104 from the first core configuration 208. Notably, the processor 102 is adjusted to operate using the second core configuration 210 without rebooting.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processor 102 having the multiple cores 104, the controller 106, the memory 108, the operating system 110, and the applications 112) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
operating a processor having multiple cores using a core configuration;
receiving a request to switch from the core configuration to a requested core configuration; and
responsive to the request and without rebooting, switching from the core configuration to the requested core configuration by:
signaling the processor to at least one of activate or deactivate one or more cores to obtain the requested core configuration, wherein signaling the processor to deactivate a core is based on falsely indicating in an active core report that the core exceeds a threshold; and
informing an operating system which cores of the processor are signaled activated and deactivated for the requested core configuration using the active core report.

2. The method of claim 1, further comprising signaling the processor to deactivate one or more cores of the processor without rebooting.

3. The method of claim 1, further comprising signaling the processor to activate one or more cores of the processor without rebooting.

4. The method of claim 1, wherein the core configuration has a different number of active cores than the requested core configuration.

5. The method of claim 1, wherein the core configuration has a different selection of active cores than the requested core configuration.

6. The method of claim 1, wherein the informing further comprises informing the operating system of a number of active cores.

7. The method of claim 1, wherein the informing comprises providing the active core report to the operating system, wherein the active core report is formatted according to an Advanced Configuration and Power Interface (ACPI) specification.

8. The method of claim 1, wherein the informing causes the operating system to provide an indication of the active cores to one or more applications.

9. The method of claim 1, wherein the informing further comprises informing at least one of the operating system or applications about a branding configuration of the processor corresponding to the requested core configuration.

10. The method of claim 1, wherein the request is received via user input to a user interface that selects one or more cores to deactivate.

11. The method of claim 1, wherein the request is received via user input to a user interface that selects one or more cores to activate.

12. The method of claim 1, wherein the request is received from an application.

13. The method of claim 1, wherein the operating system includes a scheduler that schedules activated cores to applications and avoids scheduling deactivated cores to applications based on the informing.

14. The method of claim 1, wherein falsely indicating in the active core report that the core exceeds a threshold comprises falsely indicating in the active core report that the core is hotter than the threshold.

15. A system comprising:
a memory;
a processor having multiple cores; and
a controller configured to, without rebooting, selectively signal to activate and deactivate cores of the processor and inform an operating system which of the cores of the processor are signaled activated and deactivated by using a communication protocol for controlling core operation on a thermal zone basis, wherein signaling to deactivate a core of the processor includes falsely indicating in an active core report that the core is hotter than a threshold.

16. The system of claim 15, wherein the signaling includes at least one of communicating signals to the processor for power gating or clock gating cores that are to be deactivated.

17. The system of claim 15, wherein the controller is configured to selectively activate and deactivate the cores of the processor without rebooting by switching from a core configuration to a requested core configuration.

18. The system of claim 15, wherein the controller is further configured to inform the operating system of a number and selection of active cores of the processor.

19. A method comprising:
displaying a user interface comprising controls for activating or deactivating cores of a processor having multiple cores;
receiving, via the user interface, user input to deactivate one or more cores of the processor; and
deactivating the one or more cores of the processor without rebooting by:
signaling the processor to deactivate the one or more cores based on falsely indicating in an active core report that the one or more cores exceed a threshold; and
informing an operating system which of the multiple cores are signaled deactivated by using the active core report.

20. The method of claim 19, wherein the user interface comprises controls for activating or deactivating each of the multiple cores of the processor.

* * * * *